SMOOTHING THE LIQUID IN A LIGHT VALVE PROJECTOR
BY MEANS OF ELECTRON BEAM
Filed March 10, 1961
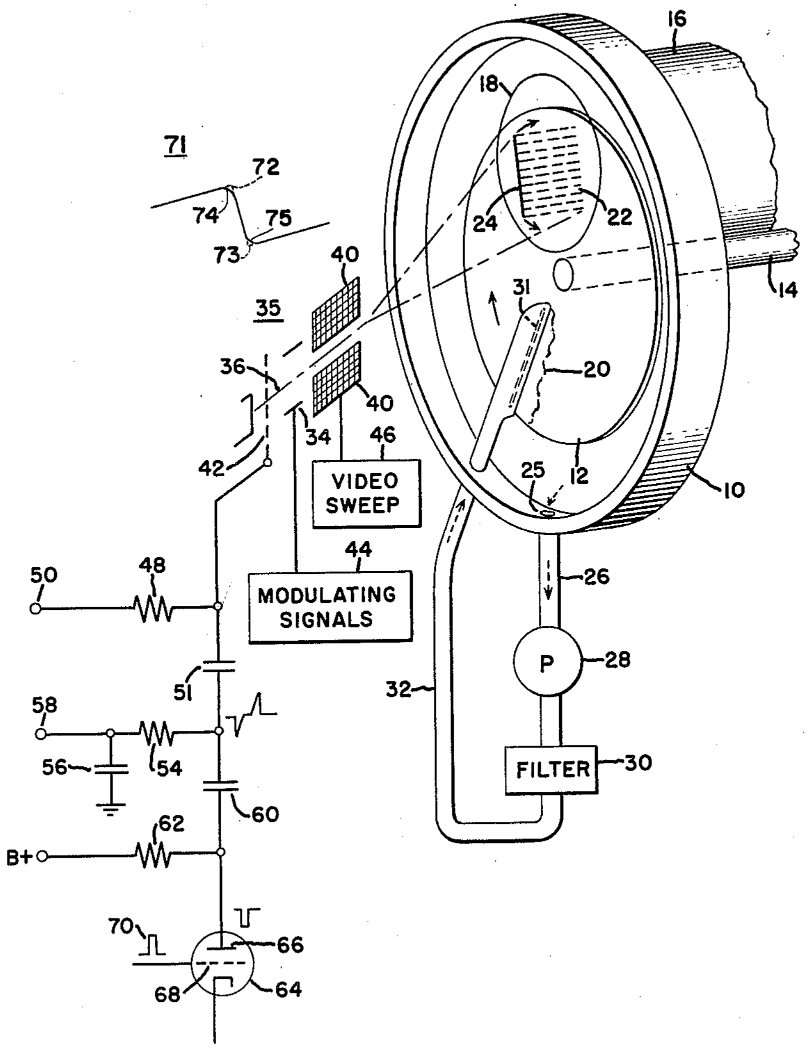
INVENTORS:
WILLIAM E. GOOD,
THOMAS T. TRUE,
BY Joseph Levinson
THEIR ATTORNEY United States Patent Office 3,155,871

Patented Nov. 3, 1964

3,155,871

SMOOTHING THE LIQUID IN A LIGHT VALVE PROJECTOR BY MEANS OF ELECTRON BEAM

William E. Good, Liverpool, and Thomas T. True, Camillus, N.Y., assignors to General Electric Company, a corporation of New York Filed Mar. 10, 1961, Ser. No. 94,860
12 Claims. (Cl. 315—22)

This invention relates to a projection television system, and more particularly to a means for smoothing a light modulating medium liquid utilized in such a system.

In the light valve projection type of television system, electrons are deposited on the surface of a deformable medium by an electron beam that is modulated by a television signal. The electrons are electrostatically attracted to the container producing deformations in the medium that are utilized to diffract light in an optical system to produce a viewable image of the television signal as a function of the diffracted light. One such system which is used to produce color television images is described in Patent Number 2,813,146, entitled "Colored Light System," and is assigned to the assignee of the present invention.

The liquid utilized for the modulating medium must be continually replaced to prevent decomposition of the liquid molecules by bombardment by the electron beam if proper operation of the system is to be assured. Accordingly, a continual flow of new liquid is provided on which gratings are written. In providing a continual flow of liquid one of the problems encountered is a churning, randomly undulating motion of the liquid surface when bombarded by the electron beam forming the television raster. This motion causes noisy background in the projected images much like random noise in a standard television system thereby spoiling dark areas and lowering contrast ratios. The noisiness of any particular liquid is a function of the raster current and beam velocity as well as the liquid parameters. It was found that the raster current which gives optimum smoothing was generally too low or too high for optimum writing of gratings on the liquid surface.

Accordingly, it is an object of this invention to provide a new and improved projection television system having means for preventing a noisy background in the projected image due to turbulence in the light modulating medium.

A further object of this invention is to provide an improved light valve projector with a simple, economical means for smoothing the liquid on which gratings are written.

In carrying out this invention, a projection system is provided with means, associated with the electron beam which forms the television raster, for increasing the charge density on the light modulating medium at the leading edge of the raster for smoothing the light modulating medium.

The invention, both as to organization and method of operation, together with further objects and advantages thereof, may best be understood by reference to the following description taken in connection with the accompanying drawing in which:

The drawing shows a schematic representation of the improved light valve projector embodied in this invention.

Referring now to the drawing, a container 10 is provided for a light modulating medium or deformable liquid 20. The container 10 houses a rotating transparent disc 12 which is driven by a shaft 14. A lens system 16 is provided which is adapted to direct light through an area 18 of the container 10. A continuously circulating system for the liquid 20 is provided by means of a slot 31 along the length of the tube 32 inside the container 10 which disperses the deformable medium onto the rotating disc 12. Excess liquid flows through an outlet 25 to a tube 26 which feeds the liquid to a pump 28. The liquid is then put through a filter 30 and returned via the tube 32 to the outlet 31 to provide a continuous flow of deformable liquid on the disc.

An electron gun 35 provides an electron beam 36 which is swept across the deformable liquid 20 in a conventional manner by a pair of magnetic deflection coils 40 (or electrostatic deflection electrodes) which are fed by an electrical sweep source 46 to trace a raster 22 on the deformable medium. RF carriers modulated by monochrome or color video signals are applied to electrostatic deflection plates 34 from a source of modulating signals 44 to cause variations in the sweep rate at the frequency of oscillation for a given color. The beam 36 thus writes a deformation grating on the liquid in the raster area 22 in accordance with the relative intensities of the color signals for each picture element. It should be understood that the present invention is suitable for use in either monochrome or color projection systems.

As was previously pointed out, a certain amount of turbulence or disturbance occurs in the deformable medium 20 due to the motion of the disc 12 and the charge distribution of the raster 22 with gratings thereon. In order to eliminate this noise, the liquid must have a smooth surface on which the raster is to be framed. One means of achieving such a result is shown in Patent Number 2,776,339 in which a smooth rake is provided for sweeping the liquid before it reaches the raster area to smooth the layer of modulating medium on which the raster is to be written. In the present invention an electron beam current is used which is not uniform over the raster 22. In one embodiment which is illustrated in the drawing, the beam current is actually pulsed to a high value at the leading edge 24 of the raster 22 where fresh liquid 20 is brought in on the surface of the disc 12. The electrostatic forces resulting from this knife edge of very high current density causes the majority of the deformable liquid 20 to flow to either side of the raster 22, and allows only a very thin layer to continue under the raster 22. The thin layer of liquid 20 which is so provided has been found to be very quiet over a wide range of raster current. Accordingly, the raster current in the region where picture information is to be written can be optimized for best grating writing without compromising the smoothness of the oil surface.

The drawing illustrates one method of increasing the charge density on the leading edge 24 of the raster 22. By this method a horizontal flyback pulse 70, which is readily available in television receivers, is applied to a grid 68 of an amplifier 64. The positive flyback pulse is inverted at the anode 66 of the amplifier 64. A source of B+ for the anode 66 is supplied via a resistor 62. The inverted flyback pulse is applied to a differentiating network consisting of a capacitor 60 and a resistor 54 and applied via a coupling capacitor 51 to a grid 42 of the electron gun 35. A large negative D.C. voltage is applied to the grid 42 via a resistor 48 from a terminal 50. Vertical blanking is applied from a terminal 58 across capacitor 56 to the grid 42. The ratio of capacitor 60 and resistor 54 determines the amount of differentiation and the extent to which the charge density of the beam 36 is affected. The positive portion of the differentiated horizontal flyback pulse increases the beam current at the end of the retrace period and consequently increases the charge density along the leading edge 24 of the raster 22 to smooth the liquid as previously described. Current pulses from two to five times larger than the average raster current can be used. The pulse has been found most effective when it occurs during the turn-around time at the edge of the raster.

Changing the charge density at the leading edge of the raster could also be accomplished by increasing the turn-around time alone without additional pulsing. For example, if the electron beam were to dwell for a longer period of time on the leading edge 24 of the raster 22 the charge density along the leading edge would be increased just as though a pulse were added in the manner previously described. This may be accomplished by changing the wave shape of the video sweep 46 which is applied to the deflection coils 40. A simple integrating network could be used to round off the corners of the sawtooth deflection current applied to the deflection coils 40 as shown in waveform 71. Waveform 71 shows the current flowing through the deflection coils 40 between termination of horizontal trace of one line and the beginning of horizontal trace of the succeeding line in a field. The portions 72 and 73 in dotted lines show the idealized form of the current wave in the transitions between trace and retrace. The corresponding rounded portions 74 and 75 in solid lines may be produced in ways well known in the art. For example, a pentode amplifier operated as a class A amplifier, to the control grid of which a voltage of the form indicated in waveform 71 is applied, would produce the waveform 71 of current. The preshaping of the sawtooth voltage wave applied to the input of the pentode amplifier could be accomplished by a conventional integrating network consisting of a suitable resistor and capacitor connected in series. Waveforms associated with electrostatic deflection systems may be likewise modified.

It will be apparent to those skilled in the art that the above principles could be used with a separate source of electrons other than the source that is used for raster writing.

Since other modifications varied to fit particular operating requirements and environments will be apparent to those skilled in the art, this invention is not considered limited to the examples chosen for purposes of disclosure and covers all changes and modifications which do not constitute departures from the true spirit and scope of this invention.

What we claim as new and desire to secure by Letters Patent of the United States is:

1. In a projection system, a light modulating liquid, means for producing an electron beam, means for periodically deflecting said electron beam over a surface area of said liquid, means for modulating said electron beam during the deflection thereof to form deposits of electron charge on said liquid in said area which produce light diffracting deformations therein, means for moving said liquid through said area in essentially the same direction, and means for increasing the density of charge deposited by said beam on said liquid at the edge of said area which faces the direction of movement of said liquid in respect to the remainder of said area.

2. In a projection system, means for producing an electron beam, a light modulating liquid having a surface disposed in the path of said beam, means for periodically deflecting said beam over an area of said surface to form a raster on said area, means for continuously circulating said liquid in essentially the same direction through said area, means for pulsing said electron beam during the time said beam traverses the edge of said area which faces the direction of flow of said liquid to increase density of charge on said liquid along said edge for controlling the physical characteristics of the liquid advancing into said area.

3. In a projection system, means for producing an electron beam, a light modulating liquid having a surface disposed in the path of said beam, means for deflecting said electron beam over an area of said surface periodically in lines similarly directed with successive lines displaced from one another along and orthogonal thereto to form a raster on said area, mechanical means for transporting said liquid through said area in the direction of deflection of said electron beam, and means associated with said electron beam for increasing the density of charge on said liquid at the periphery of said area facing the direction of transport of said liquid.

4. In a projection system, means for producing an electron beam, a light modulating liquid having a surface disposed in the path of said beam, means for deflecting said electron beam over an area of said surface periodically in lines similarly directed with successive lines displaced from one another along and orthogonal thereto to form a raster on said area, mechanical means for transporting said liquid through said area in the direction of deflection of said electron beam, and means associated with said electron beam for increasing the time during which said electron beam dwells on the edge of said area which faces the direction of transport of said liquid thereby increasing the density of charge on said liquid at said edge.

5. In a projection system including a deformable light modulating medium extending across an electric charge deposition area and means for producing an electron beam for depositing electric charge on said deformable medium in said area, means for moving said medium to advance different portions of said medium through said area in a uniform direction, means for modulating said electron beam to deposit electric charges on said medium in said area to produce corresponding light deviating deformations therein, and means for producing on said medium in said area a line of charge adjacent the edge of said area from which said medium traverses said area to control the physical properties of said medium advancing beyond said line of charge.

6. In a projection system including a deformable light modulating medium extending across an electric charge deposition area and means for producing an electron beam for depositing electric charge on said deformable medium in said area, means for moving said medium to advance different portions of said medium through said area in a uniform direction, means for modulating said electron beam to deposit electric charges on said medium in said area to produce corresponding light deviating deformations therein, and means for producing a concentration of charge in said area along and adjacent to the edge of said area disposed in the direction of advance of said medium into said area to smooth the surface of said medium advancing into said area.

7. In a projection system including a deformable light modulating medium extending across an electric charge deposition area and means for producing an electron beam for depositing electric charge on said deformable medium in said area, means for moving said medium to advance different portions of said medium through said area, means for modulating said electron beam to deposit electric charges on said medium in said area to produce corresponding light deviating deformations therein, and means for modulating said electron beam to deposit a line of charge adjacent the edge of said area from which said medium traverses said area.

8. In a projection system including a deformable light modulating medium extending across an electric charge deposition area and means for producing an electron beam for depositing electric charge on said deformable medium in said area, means for moving said medium to advance different portions of said medium through said area, means for periodically deflecting said beam across said medium in said area from the side into which said medium moves to the opposite side thereof in lines successively spaced from one another orthogonal to the direction of the deflection, means for modulating said beam during the deflection thereof to deposit electric charges on said medium in said area thereby producing corresponding light deviating deformations therein, and means for modulating said beam at the initiation of each of said lines of deflection to deposit substantially the same quantity of charges on said medium in corresponding parts of each line of deflection to form a line of charge thereon of substantially uniform concentration along the length thereof whereby the surface of said medium advancing into said area is smoothed.

9. In a projection system including a deformable light modulating medium extending across an electric charge deposition area and means for producing an electron beam for depositing electric charge on said deformable medium in said area, means for moving said medium to advance different portions of said medium through said area, means for periodically deflecting said beam across said medium in said area from the side into which said medium moves to the opposite side thereof in lines successively spaced from one another orthogonal to the direction of the deflection, means for modulating said beam during the deflection thereof to deposit electric charges on said medium in said area thereby producing corresponding light deviating deformations therein, and means for increasing the current of said beam at the initiation of each of said lines of deflection to deposit substantially the same quantity of charges on said medium in corresponding parts of each line of deflection forming a line of charge therein of substantially uniform concentration along the length thereof greater in magnitude than the charge producing said light deviating deformations whereby the surface of said medium advancing into said area is smoothed.

10. In a projection system including a deformable light modulating medium extending across an electric charge deposition area and means for producing an electron beam for depositing electric charge on said deformable medium in said area, means for moving said medium to advance different portions of said medium through said area, means for periodically deflecting said beam across said medium in said area from the side into which said medium moves to the opposite side thereof in lines successively spaced from one another orthogonal to the direction of the deflection, means for modulating said beam during the deflection thereof to deposit electric charges on said medium in said area thereby producing corresponding light deviating deformations therein, and means for reducing the rate of deflection of said beam at the initiation of each of said lines of deflection to deposit substantially the same quantity of charges on said medium in corresponding parts of each line of deflection forming a line of charge thereon of substantially uniform concentration along the length thereof greater in magnitude than the average concentration of charge producing said light deviating deformations whereby the surface of said medium advancing into said area is smoothed.

11. In a projection system including a deformable light modulating medium extending across an electric charge deposition area and means for producing an electron beam for depositing electric charges on said deformable medium in said area, means for moving said medium to advance different portions of said medium through said area, means for applying a train of electric magnetic waves each having a long interval of increasing field and a short interval for decreasing field for periodically deflecting said beam across said area gradually from the side into which said medium moves to the opposite side thereof in lines spaced from one another in a direction orthogonal to the direction of said periodic deflection, a source of pulses of voltage each occurring during a sharply falling portion of a respective wave, means for modifying each of said pulses to include a short pulse generally coincident with the time of occurrence of the trailing edge thereof, means for applying said modified pulses to said beam producing means to block the current of said beam during the occurrence of said pulses and to pass the current of said beam during the occurrence of said short pulses to deposit charges on said medium in corresponding parts of each line of deflection during the occurrence of said short pulses.

12. In a projection system including a deformable light modulating medium extending across an electric charge deposition area and means for producing an electron beam for depositing electric charges on said deformable medium in said area, means for moving said medium to advance different portions of said medium through said area, means for applying a train of sawtooth waves of voltage each having a long interval of increasing voltage and a short interval of decreasing voltage for periodically deflecting said beam across said area gradually from the side into which said medium moves to the opposite side thereof in lines spaced from one another in a direction orthogonal to the direction of said periodic deflection, means for modulating said beam during the deflection thereof to deposit electric charges on said medium in said area thereby producing corresponding light deviating deformations therein, a source of pulses of voltage each occurring during a sharply falling portion of a repective wave, means for modifying each of said pulses to include a short pulse generally coincident with the time of occurrence of the trailing edge thereof and of opposite polarity thereto, and means for applying said modified pulses to said beam producing means to block the current of said beam during the occurrence of said pulses and to pass the current of said beam during the occurrence of said short pulses to deposit charges on said medium in corresponding parts of each line of deflection during the occurrence of said short pulses.

References Cited in the file of this patent

UNITED STATES PATENTS 2,391,451 Fischer ---------------- Dec. 25, 1945
2,957,942 Glenn ----------------- Oct. 25, 1960